United States Patent
Arnold et al.

(10) Patent No.: US 8,181,462 B2
(45) Date of Patent: May 22, 2012

(54) TURBOCHARGER WITH TWO-STAGE COMPRESSOR, INCLUDING A TWIN-WHEEL PARALLEL-FLOW FIRST STAGE

(75) Inventors: Steven D. Arnold, Torrance, CA (US); Will J. Smith, Torrance, CA (US); Mike Guidry, Torrance, CA (US); Jeff Letterman, Torrance, CA (US); James Reyenga, Torrance, CA (US); Vai-Man Lei, Torrance, CA (US); Asit Singhal, Torrance, CA (US); Kelvin Buneirisert, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 285 days.

(21) Appl. No.: 12/489,614

(22) Filed: Jun. 23, 2009

(65) Prior Publication Data

US 2010/0319343 A1    Dec. 23, 2010

(51) Int. Cl.
F02B 33/44    (2006.01)
(52) U.S. Cl. ......... 60/612
(58) Field of Classification Search ........ 60/612; 123/212; 492/12
See application file for complete search history.

(56) References Cited

U.S. PATENT DOCUMENTS

| | | | |
|---|---|---|---|
| 2,767,561 A * | 10/1956 | Seeger | 62/241 |
| 4,798,523 A * | 1/1989 | Glaser et al. | 417/407 |
| 5,157,924 A * | 10/1992 | Sudmanns | 60/612 |
| 6,301,889 B1 | 10/2001 | Gladden et al. | |
| 6,324,848 B1 * | 12/2001 | Gladden et al. | 60/612 |
| 6,357,234 B1 * | 3/2002 | Gladden | 60/612 |
| 6,442,936 B1 * | 9/2002 | Houtz | 60/612 |
| 7,640,745 B2 * | 1/2010 | Japikse | 60/605.1 |
| 2002/0041813 A1 | 4/2002 | Fledersbacher et al. | |
| 2003/0115876 A1 * | 6/2003 | Shaffer | 60/612 |
| 2005/0005606 A1 | 1/2005 | Vrbas et al. | |
| 2005/0061000 A1 * | 3/2005 | Awdalla | 60/612 |
| 2005/0198957 A1 * | 9/2005 | Kim | 60/612 |
| 2006/0123785 A1 | 6/2006 | Sundin et al. | |
| 2006/0260309 A1 * | 11/2006 | Arnold et al. | 60/605.1 |
| 2007/0077459 A1 * | 4/2007 | Walton et al. | 429/12 |

FOREIGN PATENT DOCUMENTS

WO    WO 2007/064631 A1    6/2007

OTHER PUBLICATIONS

International Search Report and Written Opinion for Application No. PCT/US2010/039111 dated Feb. 13, 2011.

* cited by examiner

Primary Examiner — Thomas Denion
Assistant Examiner — Cameron Setayesh
(74) Attorney, Agent, or Firm — Alston & Bird LLP

(57) ABSTRACT

A single-shaft exhaust gas-driven turbocharger includes two parallel-flow first-stage centrifugal compressors in series with a single second-stage centrifugal compressor, and a one-stage turbine arranged to drive both the first- and second-stage centrifugal compressors via a single shaft on which the compressors and turbine are fixedly mounted. The compressor housing defines from one to a plurality of circumferentially spaced inlet ducts for the second wheel of the first stage, and from one to a plurality of circumferentially spaced inter-stage ducts leading from a vaneless diffuser of the first stage into the inlet of the second stage.

29 Claims, 14 Drawing Sheets

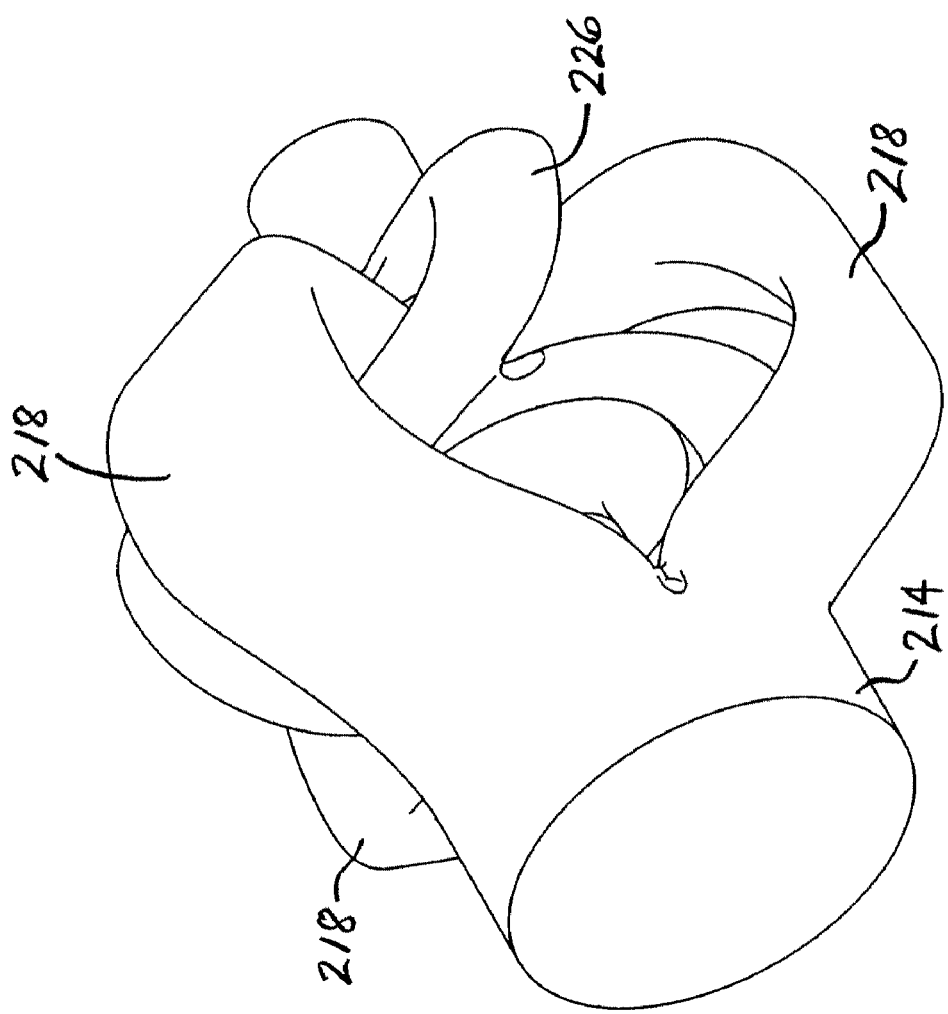

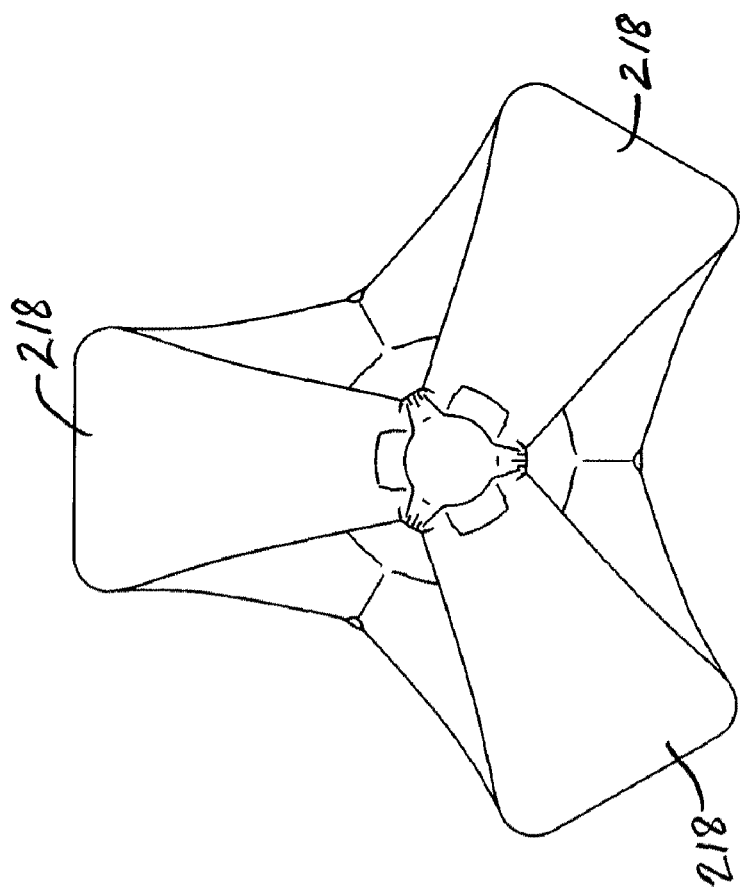
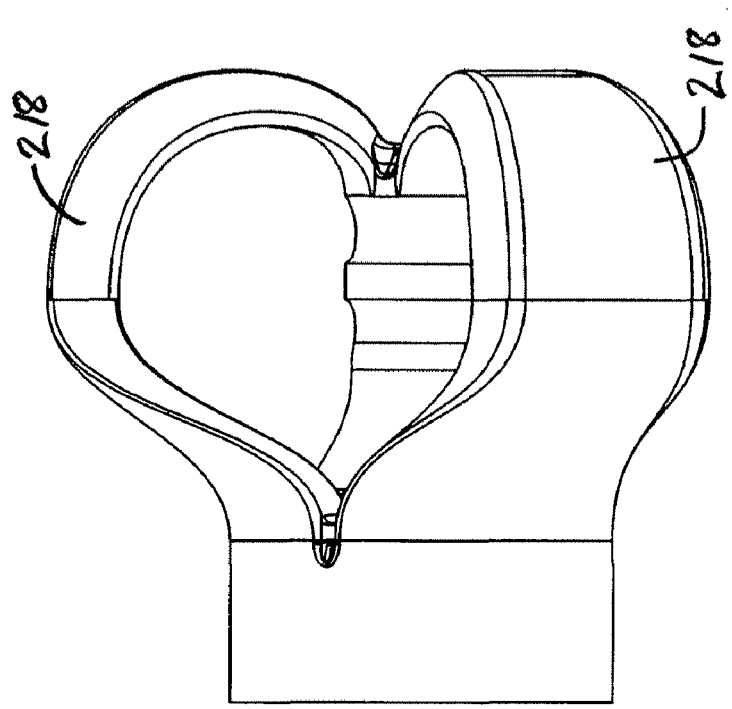
FIG. 7A
FIG. 7B

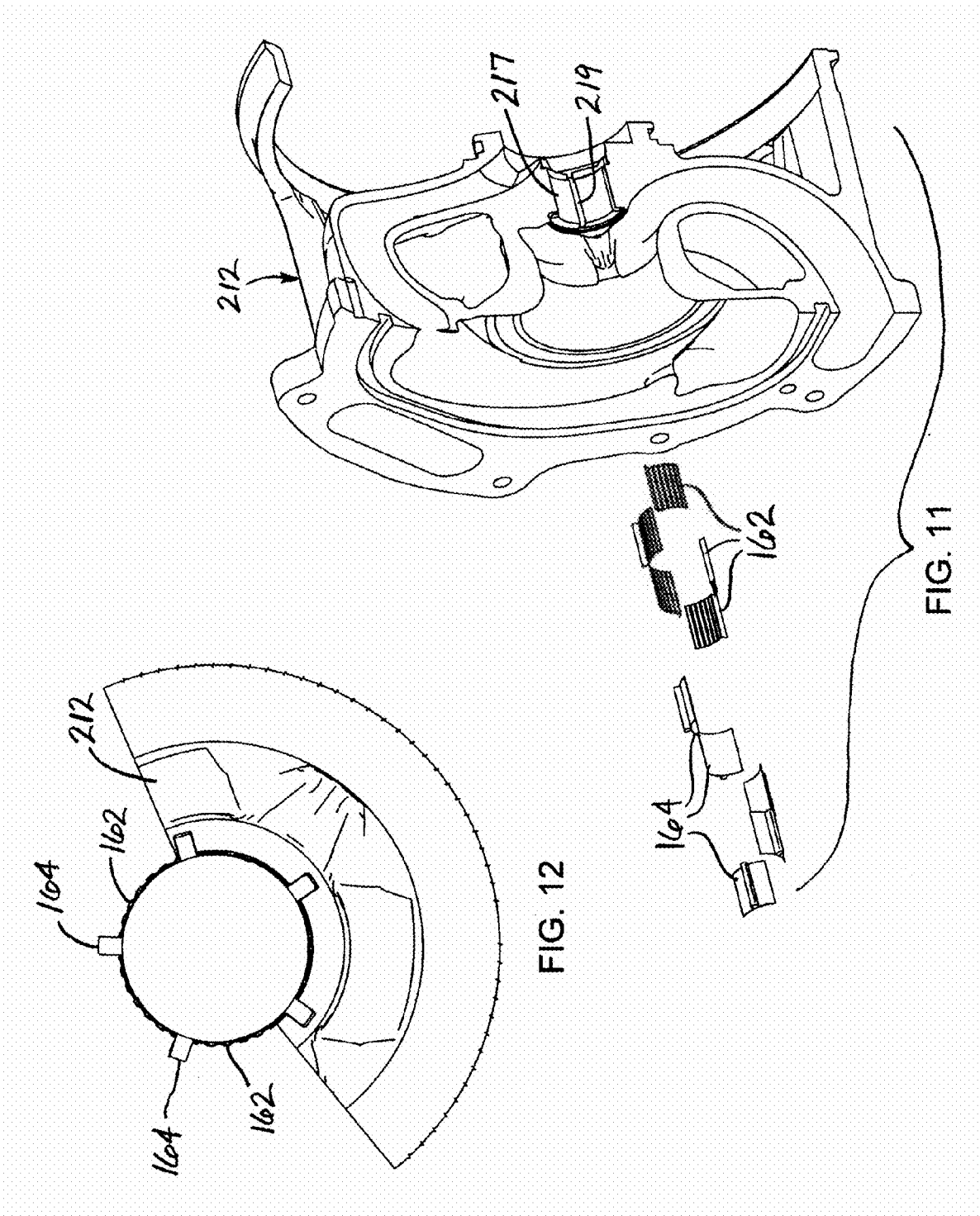

TURBOCHARGER WITH TWO-STAGE COMPRESSOR, INCLUDING A TWIN-WHEEL PARALLEL-FLOW FIRST STAGE

BACKGROUND OF THE INVENTION

The present disclosure relates to exhaust gas-driven turbochargers.

Increasingly stringent emissions regulations have driven many changes in diesel engines, one of which is the widespread use of exhaust gas recirculation (EGR), wherein exhaust gas from the engine is used as a working fluid diluent to reduce peak combustion temperatures. The formation of oxides of nitrogen (NOx) increases exponentially with temperature ($e^T$), so a reduction of the peak temperature through heat transfer to a non-combustible gas mixed with the combustible fuel and air is very effective at reducing NOx.

In the U.S., EPA regulations have reduced NOx limits from 8 g/kW-hr in 1998 to 0.2 g/kW-hr in 2010, a 97.5% reduction in 12 years. Unfortunately, there has not been a remarkable device (such as the 3-way catalyst was for gasoline engines) invented for diesel engines. Alternative combustion modes, EGR, Selective Catalytic Reduction (SCR), and Lean NOx Traps (LNT) are four very effective methods to reduce NOx. Unfortunately none are much more than 90% effective, and therefore a combination of two or more of these technologies is generally used.

EGR has been a mainstay through the first decade of the $21^{st}$ century to achieve NOx reduction in diesel engines, but it also has negative effects. These include increased wear and corrosion in the engine, contamination of the oil with soot and acidic materials, increased heat rejection of the engine through heat exchangers instead of through the exhaust, and increased pumping loss to the engine. Careful product development has been able to mitigate much of these negative effects, with the exception of increased pumping loss. The development described in the present application is aimed in part at minimizing the increased pumping loss for extremely high EGR engines, or increasing the maximum possible EGR rate while maintaining a modest pumping loss.

For EGR to flow from the exhaust manifold through an EGR cooler and then to the intake manifold, the exhaust manifold must be at a higher pressure than the intake manifold. This results in "negative pumping work" as explained below.

Traditionally, high-efficiency turbochargers were capable of producing more boost pressure than the back pressure they created on the exhaust manifold in turbo-diesel engines. This produced a "positive pumping work" and added to the work output of the engine. With a high pressure loop EGR system, this must be a "negative pumping work", which means it reduces the work output and efficiency of the engine. The more EGR that is driven, the higher this negative pumping work becomes. In addition, the EGR is additional mass flow that must be pumped through the engine. This requires additional boost pressure to increase the density of the combined air and EGR to match the volumetric flow of the engine. The turbocharger sees additional EGR flow as a reduced "fresh air" volumetric efficiency of the engine. Assuming the fresh air mass flow remains the same, the boost must increase significantly to pump the EGR through the engine as well. Since a diesel engine runs lean with 20% or more excess oxygen, the recirculated exhaust gas still contains oxygen, and hence the fresh air that must be supplied is somewhat reduced.

At modest levels of EGR (roughly up to 10%), turbocharger efficiency must be artificially reduced to assure the needed negative pressure gradient. This has been done through a variety of methods, including increasing turbine clearances, or introducing a step area reduction in the flow path.

At moderate levels of EGR (roughly 10-20%), usually it is not necessary to reduce the efficiency of the turbocharger to achieve the required negative pressure gradient, and the negative pumping work is approximately ½ bar "pumping mean effective pressure" (PMEP) or less.

At high levels of EGR (roughly 20-30%), the pumping work becomes much more severe and the turbocharger efficiencies start to fall off as the pressure ratio rises, increasing the pumping work unnecessarily. Above 25% EGR (at full load), generally two stage turbocharging becomes necessary.

At extreme levels of EGR (over 30% at full load), the mis-match of the compressor(s) and turbine(s) becomes so severe that the fuel consumption penalty caused by negative pumping work becomes intolerable and engine manufacturers choose to lower the EGR rate and rely on other NOx reduction technologies such as SCR or LNTs.

The aerodynamic performance of compressors and turbines is a function of the volume flow, rather than the mass flow, through the stage. The compressor receives ambient air to compress, while the turbine receives high-temperature and high-pressure exhaust gas to expand. As EGR is increased, the total flow through the engine (air plus EGR) is increased, and thus the boost pressure is increased. When an extremely high level of EGR is driven through the engine, the volume flow of the turbine is very small compared to the volume flow of the compressor, and hence the compressor and turbine should be significantly different sizes. Because the speed at which the compressor and turbine desirably should be run for best efficiency is inversely proportional to the diameter of each device, the compressor and turbine therefore should operate at different speeds. With a single shaft connecting them, however, this is physically impossible. Accordingly, generally the turbine is forced to operate at a speed required by the compressor to produce the pressure ratio and mass flow required by the engine, which results in poor turbine efficiency because it is operating too slowly.

It can be shown that to achieve optimum turbine efficiency, the ratio of the turbine tip speed, U (angular rotational rate multiplied by the radius at the tip) to the gas speed, $C_o$, must be approximately 0.7. Since the gas velocity is fixed by the engine condition, the independent variables are the turbine speed and diameter. The compressor sets the shaft speed; therefore, the only independent variable left is the turbine diameter.

Unfortunately, the turbine diameter must be kept as small as possible to preserve acceptable transient response of the engine. The flow of the turbine is a function of the diameter squared, but the inertia of the turbine is a function of the diameter of the turbine diameter to the $5^{th}$ power. One can easily see that the optimum solution for dynamic response is to have the smallest diameter turbine that can pass the engine flow. This results in a poor $U/C_o$, which limits the turbine efficiency.

BRIEF SUMMARY OF THE DISCLOSURE

The conclusions one reaches when considering the turbocharger requirements for a diesel engine with ultra-high levels of EGR are that (1) a two-stage compressor will be needed for the pressure ratio and map width requirements, and (2) the $U/C_o$ of a single turbine would be too low and would result in poor efficiency with a single-stage compressor and much worse with a two-stage compressor, as the tip speed (U) would be extremely low.

A turbocharger architecture is needed that accommodates the large flow capacity of the first compression stage, yet provides a high-speed, low-flow configuration for the turbine.

These needs are at least partially met, and additional advantages are achieved, in accordance with one aspect of the present disclosure, which describes a single-shaft exhaust gas-driven turbocharger comprising two parallel-flow first-stage centrifugal compressors in series with a single second-stage centrifugal compressor, and a one-stage turbine arranged to drive both the first- and second-stage centrifugal compressors via a single shaft on which the compressors and turbine are fixedly mounted. With this arrangement, the first-stage compressor is capable of the high volumetric flow rate required in order to produce the mass flow needed by the engine, and the two-stage compressor is able to provide the high pressure ratio needed in order to pump the high levels of EGR required. At the same time, the unique two-stage compressor arrangement can operate at the higher speed needed in order to achieve acceptable turbine efficiency, and thus the turbine can be small and highly responsive.

In one embodiment, the two first-stage centrifugal compressors are arranged back-to-back. A unique arrangement of interleaved inlet ducting for the rearward-facing first-stage compressor and interstage ducting between the two compressor stages is employed, as further described below.

In accordance with one embodiment, a first bearing assembly rotatably supports the shaft at a location between the turbine and the second-stage centrifugal compressor, and a second bearing assembly rotatably supports the shaft at a location between the first-stage centrifugal compressors and the second-stage centrifugal compressor. Advantageously, the first bearing assembly includes ball bearings, and can comprise, for example, two axially spaced ball bearings. The second bearing assembly advantageously comprises a foil air bearing.

An exhaust gas-driven turbocharger in accordance with one particular embodiment comprises:
 a shaft having a first end and a second end;
 a one-stage turbine wheel mounted on the shaft proximate the first end;
 a turbine housing surrounding the turbine wheel and defining ducting for directing exhaust gas into and out of the turbine wheel;
 a first-stage compressor wheel mounted on the shaft proximate the second end, the first-stage compressor wheel comprising first and second impellers disposed back-to-back;
 a second-stage compressor wheel mounted on the shaft at a location intermediate the first-stage compressor wheel and the turbine wheel; and
 a compressor housing assembly surrounding the first- and second-stage compressor wheels and defining:
  inlet ducting configured to direct two separate portions of air in generally opposite axial directions into respective inlets of the first and second impellers of the first-stage compressor wheel;
  interstage ducting configured to direct pressurized air from an exit of each of the impellers of the first-stage compressor wheel into an inlet of the second-stage compressor wheel; and
  discharge ducting configured to collect pressurized air discharged from the second-stage compressor wheel for supply to an intake of an internal combustion engine;
 wherein the first- and second-stage compressor wheels and the turbine wheel are all fixedly mounted on the shaft and therefore rotate at the same angular rate of rotation.

The inlet ducting in one embodiment comprises a common duct configured to conduct air for both the first and second impellers of the first-stage compressor wheel, a first duct configured to conduct one portion of the air from the common duct into the inlet of the first impeller, and from one to a plurality of separate second ducts configured to conduct a remaining portion of the air from the common duct into the inlet of the second impeller. When there are multiple second ducts, they are circumferentially spaced apart from one another about a rotational axis defined by the shaft.

The interstage ducting in one embodiment comprises from one to a plurality of separate third ducts. When there are multiple third ducts, they are circumferentially spaced apart from one another about the rotational axis. The second and third ducts alternate with one another in the circumferential direction about the rotational axis (i.e., they are "interleaved"). In a particular embodiment, there are three second ducts and three third ducts, the second ducts being spaced substantially uniformly about the rotational axis and the third ducts being spaced substantially uniformly about the rotational axis. Because there is space between each second duct and the third ducts adjacent thereto, there is thermal isolation between the second and third ducts. Alternatively, the second ducts and third ducts can be spaced non-uniformly about the rotational axis, which may be beneficial for avoiding exciting vibration of the compressor wheels.

In one embodiment, each of the third ducts has a substantially constant flow area between the exit of the first-stage compressor wheel and the inlet of the second-stage compressor wheel.

In accordance with one embodiment, there are three third ducts respectively connected to three partial volutes that received pressurized air from the first-stage compressor wheel, each of the partial volutes occupying approximately one-third of a 360° circumference (i.e., approximately 120°) about the rotational axis.

As noted, in one embodiment a first bearing assembly rotatably supports the shaft at a location between the turbine wheel and the second-stage compressor wheel. A center housing formed separately from the compressor housing assembly contains the first bearing assembly.

In a particular embodiment, the compressor housing assembly includes a first-stage compressor housing that contains the first-stage compressor wheel and defines the inlet ducting and interstage ducting, and a second-stage compressor housing that contains the second-stage compressor wheel and defines the discharge ducting in the form of a discharge volute for the second-stage compressor wheel, the second-stage compressor housing being formed separately from the first-stage compressor housing. The center housing defines a generally annular flange that extends generally radially outwardly. The first-stage compressor housing is affixed to the flange of the center housing, and the second-stage compressor housing is affixed to the flange of the center housing independently of the affixation of the first-stage compressor housing thereto.

It is advantageous in some cases for the second-stage compressor housing to be connected by a flexible connection to the first-stage compressor housing in the region of the interstage ducting. The flexible connection can comprise a generally annular portion of one of the compressor housings received within a generally annular portion of the other of the compressor housings, with a radial clearance existing between the annular portions, a flexible compressible element being disposed between the annular portions to seal the flexible connection. This effectively decouples the first-stage compressor housing from the second-stage compressor housing.

In one advantageous embodiment, the first-stage compressor housing defines a plurality of separate legs that are circumferentially spaced apart from one another and that extend generally axially and are affixed to the flange of the center housing.

In one embodiment in which a foil air bearing rotatably supports the shaft at a location between the first- and second-stage compressor wheels, the foil air bearing includes a foil bearing journal formed as an integral part of the first-stage compressor wheel. It is a feature of one embodiment that the foil air bearing also serves as a seal between the first- and second-stage compressor wheels. The foil bearing is arranged such that air that leaks through the seal cools the foil bearing.

Other features and advantages of embodiments of the present development are described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 6 is a perspective view showing the compressor flow passages as a solid body;

FIG. 7A is a side view showing the inlet flow passages to the rear-facing first-stage impeller as a solid body;

FIG. 7B is an axial view showing the inlet flow passages to the rear-facing first-stage impeller as a solid body;

FIG. 11 is an exploded view of a foil air bearing assembly used in the turbocharger of FIG. 3;

FIG. 12 is a fragmentary cross-sectional view through the foil bearing assembly;

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
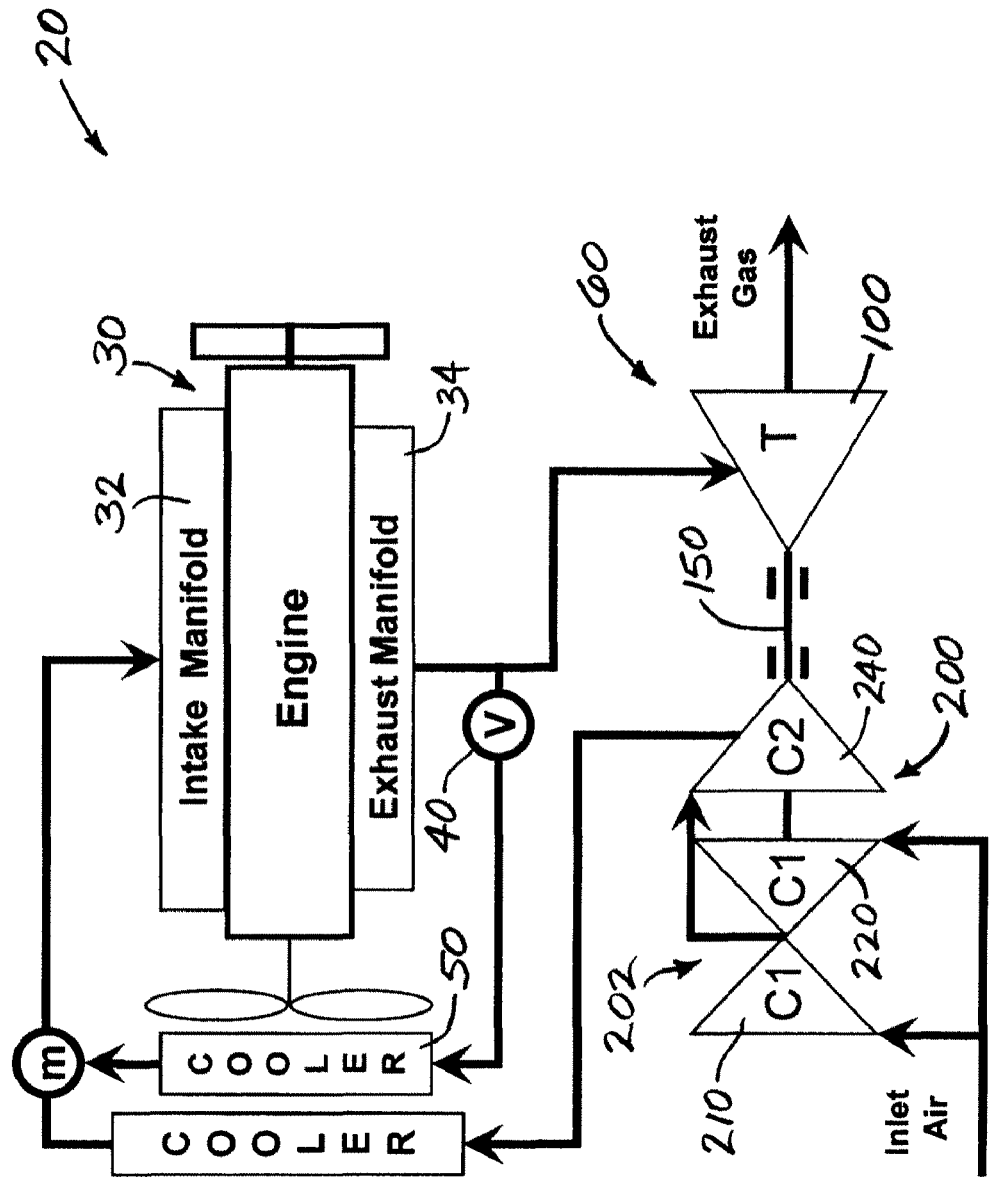
FIG. 1 is a diagrammatic view of a turbocharger-engine arrangement in accordance with one embodiment of the present invention.

FIG. 1 schematically illustrates a turbocharger-engine system 20 in accordance with one embodiment of the invention. The system includes an internal combustion engine 30, such as a reciprocating diesel engine. The engine has an intake manifold 32 that receives fresh air for mixing with fuel, and an exhaust manifold 34 that receives exhaust gas from the cylinders of the engine. A portion of the exhaust gas is recirculated to the fresh air side of the engine via an exhaust gas recirculation (EGR) loop. An EGR valve 40, under the control of an engine control unit (not shown), regulates the EGR flow rate. The recirculated exhaust gas can be cooled in an EGR cooler 50 before being supplied to the engine air intake. The system 20 also includes a turbocharger 60.

The turbocharger 60 includes a turbine 100 that receives the hot exhaust gas from the engine's exhaust manifold and expands the gas to extract mechanical power that is used for driving a compressor 200 of the turbocharger. The compressor receives ambient fresh air and compresses the air to a higher pressure, which is then supplied to the engine's intake manifold. The pressurized air can be cooled in a cooler 70 before being supplied to the engine. As diagrammatically depicted in FIG. 1, the compressor 200 is a two-stage compressor. A first-stage compressor 202 comprises back-to-back first and second impellers 210, 220 that are arranged in a parallel-flow arrangement such that each impeller receives its own separate stream of fresh ambient air via inlet ducting. The two impellers 210, 220 in one embodiment are integrally formed together as a one-piece wheel, although that is not an essential aspect of the present invention. The combined air discharged from the first-stage impellers 210, 220 is then supplied via interstage ducting to a second-stage impeller 240 that further compresses the air for supply to the engine. In one embodiment, a heat exchanger can be disposed between the first-stage compressor 202 and the second-stage impeller 240 for cooling the compressed air before it is supplied to the inlet of the second-stage impeller. The turbine wheel and impellers are all fixedly mounted on the same shaft 150 such that they all rotate at the same angular rate of rotation.

Figure 2:
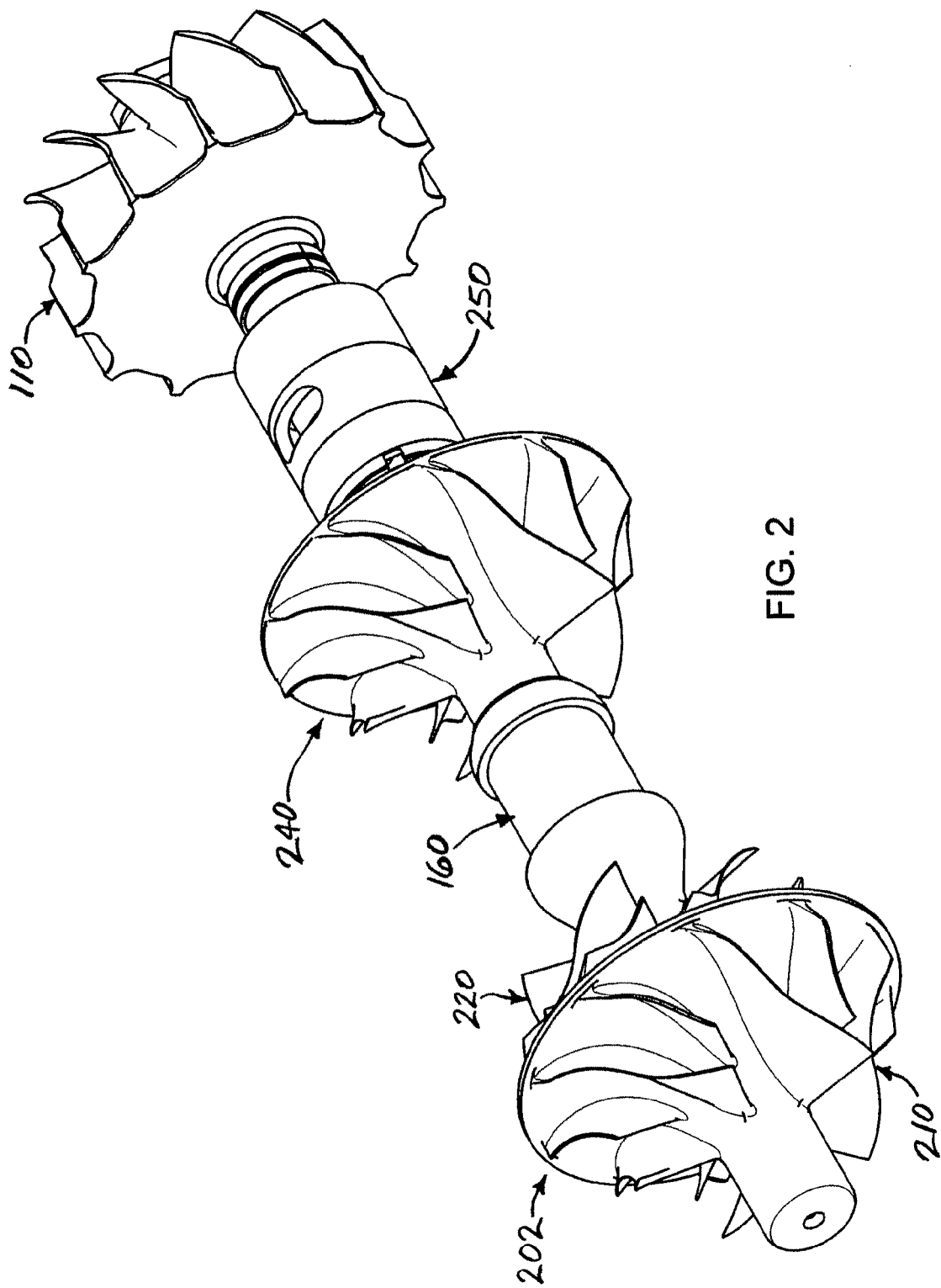
FIG. 2 is a perspective view of a rotor of a turbocharger in accordance with one embodiment of the invention.
Figure 10B:
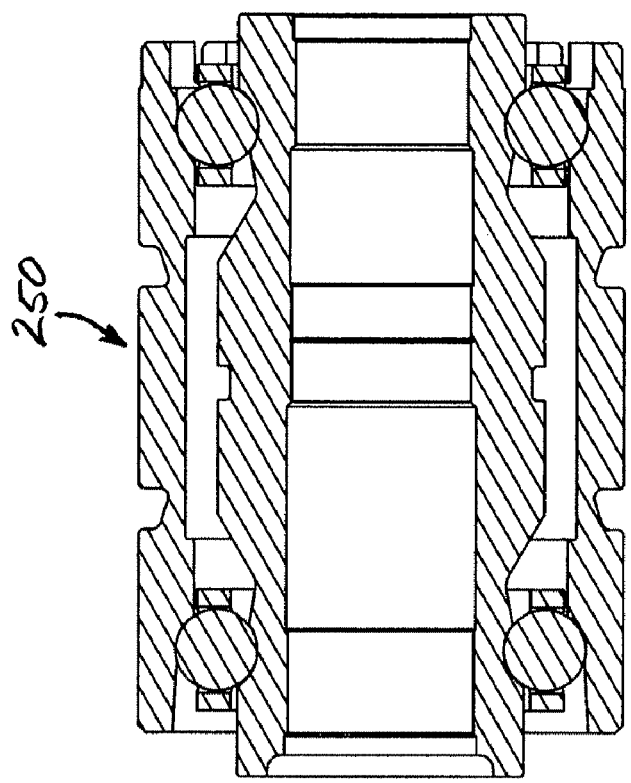
FIG. 10B is a cross-sectional view of the ball bearing cartridge used in the turbocharger of FIG. 3.
Figure 10A:
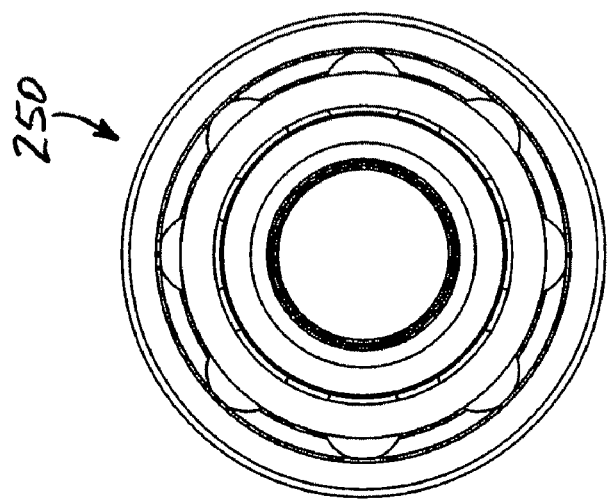
FIG. 10A is an axial end view of a ball bearing cartridge used in the turbocharger of FIG. 3.

FIG. 2 is a perspective view of the rotor of the turbocharger in accordance with one embodiment of the invention. The rotor comprises the shaft 150 (FIG. 3), a turbine wheel 110 mounted on the shaft proximate one end thereof, and the first-stage impellers 210, 220 mounted on the shaft proximate its opposite end. At an intermediate location along the shaft, the second-stage impeller 240 is mounted. A first bearing assembly 250 rotatably supports the shaft at a location between the second-stage impeller 240 and the turbine wheel 110. The first bearing assembly can comprise ball bearings, and particularly can comprise two axially spaced ball bearings contained in a cartridge, generally as described in U.S. Pat. No. 4,798,523 to Glaser et al., the entire disclosure of which is hereby incorporated herein by reference. The first bearing assembly is shown in details in FIGS. 10A and 10B, further described below.

Because of the large amount of overhang of the compressor section beyond the ball bearing assembly 250, a challenge in executing this concept is the design of a bearing system to achieve proper support with low losses and, most importantly, rotor dynamic stability. A third oil bearing could be inserted between the first- and second-stage compressors, but this is generally inadvisable because the rotor then can become over-constrained with even a slight amount of centerline misalignment of the bearings. Additionally, adding a third oil bearing means that oil must be supplied to a second location and seals must be incorporated on both sides of the bearing, along with an appropriate oil drain.

A novel solution to this problem is to use the ball bearing cartridge 250 with fluid film damper in the traditional location between the turbine and compressor, and an air bearing between the first- and second-stage compressors. For that purpose, a portion of the rotor located between the first-stage compressor wheel 202 and the second-stage compressor wheel 240 is formed as an air bearing journal 160. As further described below, the air bearing journal 160 in one embodiment is formed integrally with the first-stage compressor wheel 202.

The ball bearing cartridge 250 is quite stiff and thus can provide most of the rotor support as well as thrust capability in both directions. The air bearing is much softer and compliant and therefore is able to comply with slight variations in the centerline orientation as a result of accumulation of tolerances or distortion caused by thermal or mechanical loading effects.

The air bearing advantageously can comprise a self-energizing foil bearing. Such foil bearings generally have to be cooled with a cool air source. In addition, a seal must be provided to seal the second-stage compressor inlet from the inlet to the rear impeller of the first-stage compressor. The foil bearing is synergistic in this regard, as it can function as the seal, and the leakage through the bearing can serve as the cooling air flow.

An additional synergy is that the foil bearing requires some length but very little diameter growth beyond the foils themselves. This space can be used to improve the aerodynamic design of the first-stage rear impeller inlet by making the turn into the inlet more gradual with a lower loss, less chance for separation, and more-uniform flow vector into the inlet.

Figure 3:
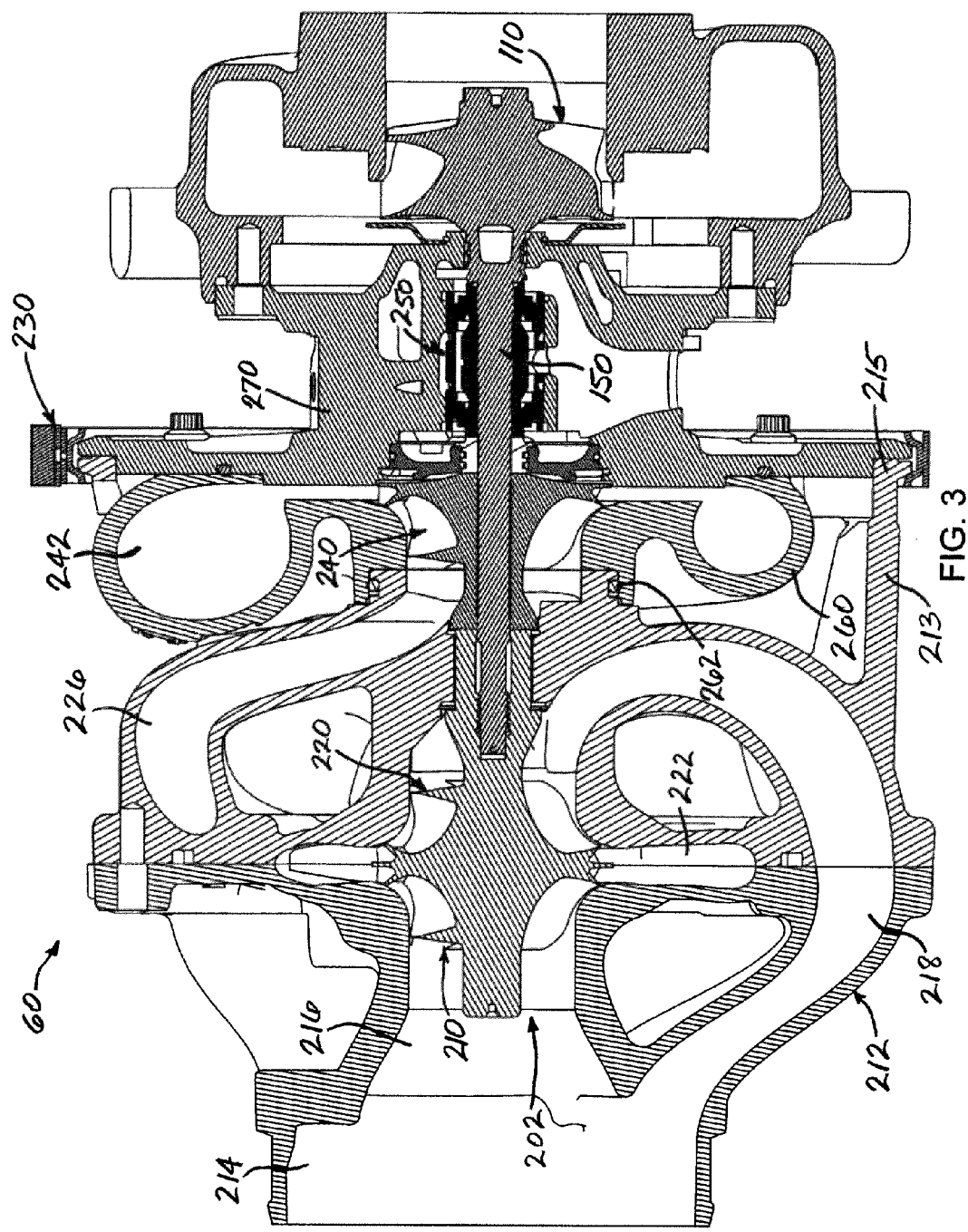
FIG. 3 is an axial cross-sectional view of a turbocharger in accordance with one embodiment of the invention.
Figure 4:
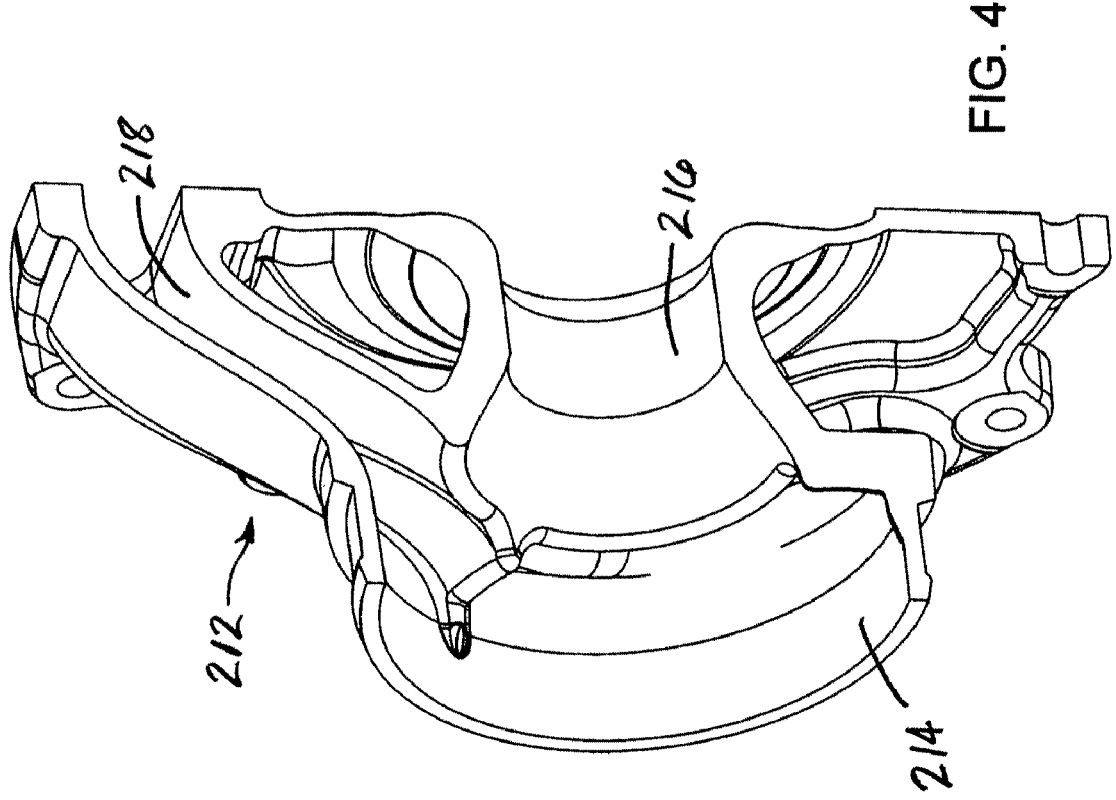
FIG. 4 is a perspective view of one portion of the first-stage compressor housing for the turbocharger of FIG. 3.
Figure 13:
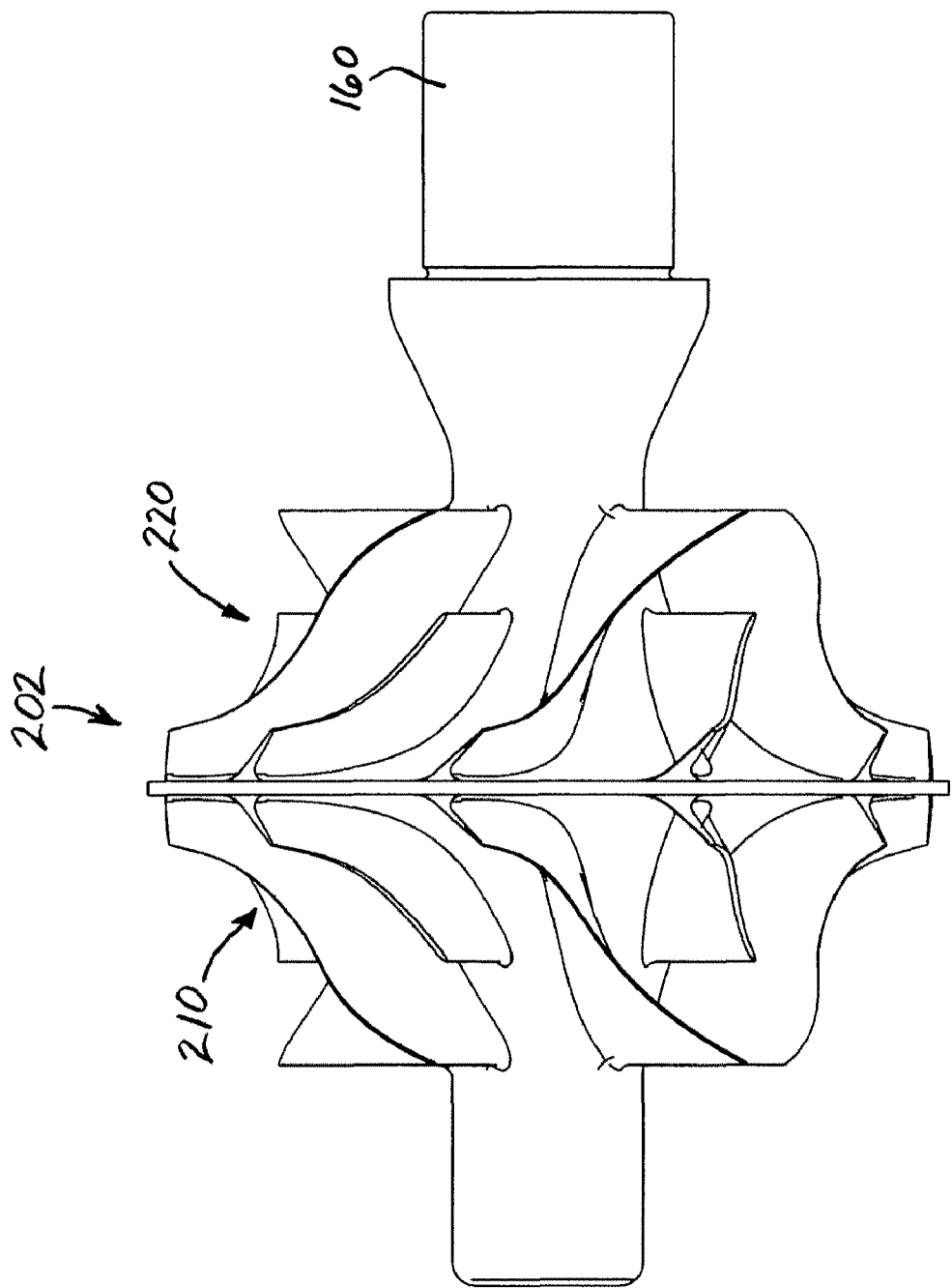
FIG. 13 is a view of the first-stage compressor wheel and integral foil bearing journal.

An additional novel feature is integration of the air bearing journal 160 into the first-stage compressor wheel 202, as shown in FIG. 13. The first-stage compressor wheel and the air bearing journal can be integrally cast together. The first-stage compressor wheel can be made of cast aluminum and the journal 160 can be plated with hard chrome, thin dense chrome, or Nikasil in order to provide an appropriate tribological surface for the air foils to mate with. With the integrated design, cooling requirements for the journal will be assured through conduction into the inlet flow. This also removes an additional tolerance from the rotor group stack-up and eliminates a pair of clamping surfaces that can introduce bending in the rotor group from a lack of parallelism. As shown in FIG. 3, the first-stage compressor wheel 202 can be affixed to the shaft 150 by way of a double-pilot boreless joint.

As one looks at FIG. 2 and imagines the flow passages required to complete the design and achieve good performance, one can see that there is a conflict between the ducting required to feed ambient air to the rear first-stage impeller 220 on the one hand, and the ducting required to convey flow from the first-stage diffuser to the second-stage compressor inlet on the other hand.

In accordance with the illustrated embodiment of the turbocharger in FIGS. 1-13, this conflict is resolved by a novel ducting arrangement that interleaves the two ducts, with minimal thermal communication between them.

With particular reference to FIG. 3, the turbocharger 60 includes a first-stage compressor housing 212 that surrounds the first impeller 210 and second impeller 220. The first-stage compressor housing 212 defines a common inlet duct 214 that carries fresh ambient air for both of the first-stage impellers 210, 220, a first duct 216 configured to conduct one portion of the air from the common duct into the inlet of the first impeller 210, and from one to a plurality of separate second ducts 218 (only one visible in FIG. 3) configured to conduct a remaining portion of the air from the common duct into the inlet of the second impeller 220. In the illustrated embodiment, there are three second ducts 218 spaced about the circumference, the circumferential spacing between them being uniform (i.e., 120° apart on center); alternatively, the spacing can be non-uniform about the rotational axis. Each of the second ducts 218 branches off from the common duct 214 at a location spaced forwardly of the front impeller 210 and proceeds in a direction generally axially rearward and radially outward, gradually turning until it is substantially purely axial where it reaches a maximum diameter at a location directly outward of the diffuser for the first-stage impellers 210, 220. From that maximum-diameter point, each second duct 218 then proceeds in a direction generally axially rearward and gradually turns radially inward through an angle of substantially 180° to lead the air into the inlet of the rear impeller 220 in a substantially axial direction opposite to the direction in which air enters the common duct 214. The objective in designing the three ducts 218 that provide inlet air to the rear first-stage impeller 220 is to provide as uniform axial flow into the impeller as possible, without swirl, while matching as closely as possible the inlet velocity and pressure field of the front impeller 210. Variation in the velocity field or a lower pressure would unbalance the two impellers, resulting in compromised performance.

Figure 5:
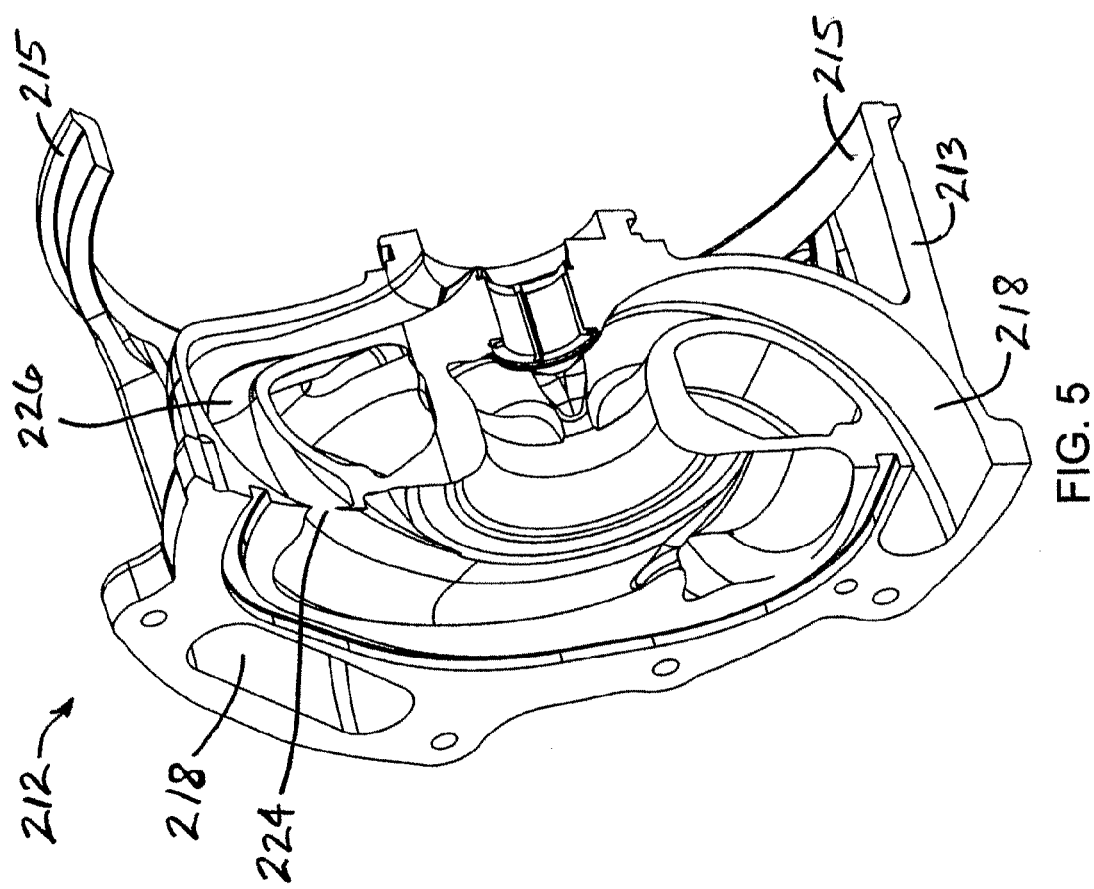
FIG. 5 is a perspective view of the remaining portion of the first-stage compressor housing.

The first-stage compressor housing 212 further defines a generally annular vaneless diffuser 222 that collects and diffuses the pressurized air discharged from the two first-stage impellers 210, 220. As best seen in FIG. 5, connected to the diffuser 222 are three partial volutes 224 (each extending circumferentially for approximately 120°) that collect the fluid from the diffuser 222 and supply the fluid to three interstage ducts 226 respectively connected to the partial volutes. More generally, there can be from one to a plurality of interstage ducts for conducting the compressed air from the first-stage compressor to the second-stage compressor. As best seen in FIG. 3, each interstage duct 226 proceeds from its respective partial volute 224 in a generally radially outward direction and turns about 90° to proceed generally axial in the rearward direction for a short distance, then turns radially inward, and finally turns to proceed substantially in the rearward axial direction as it leads into the inlet of the second-stage compressor wheel 240.

The objective of the three partial volutes 224 connected to the interstage ducts 226 is again to provide a uniform velocity field into the second-stage compressor inlet. Because there is no second impeller as there is with the first stage, the second-stage compressor can tolerate somewhat more non-uniformity in swirl and/or pressure profile at its inlet, and these can be factored into the second-stage impeller design.

Figure 8B:
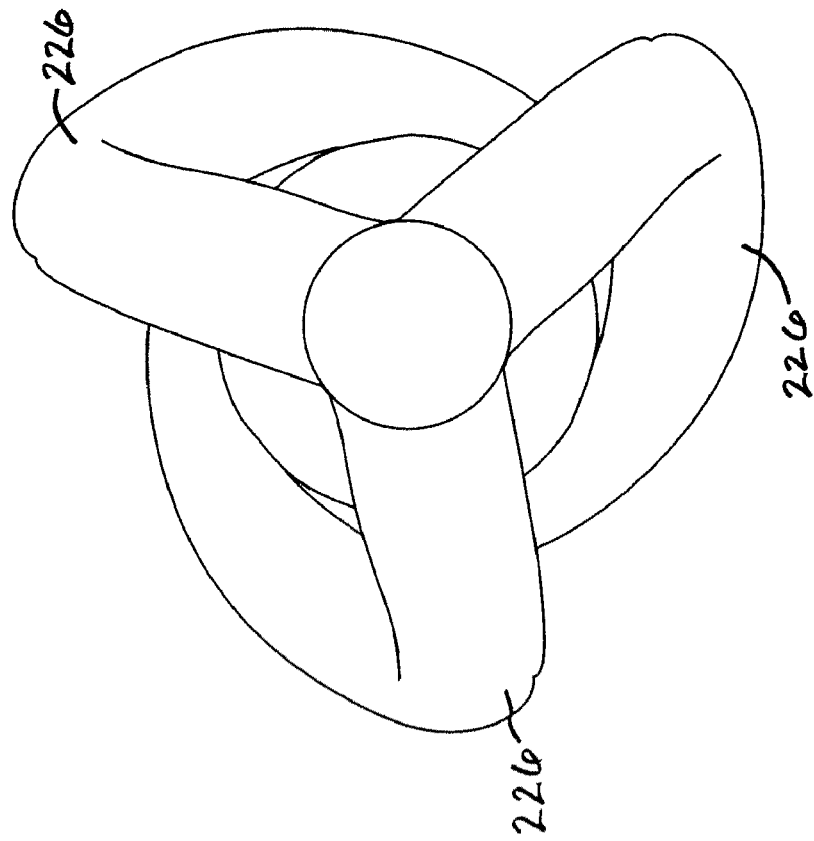
FIG. 8B is an axial view showing the compressor interstage flow passages as a solid body.
Figure 8A:
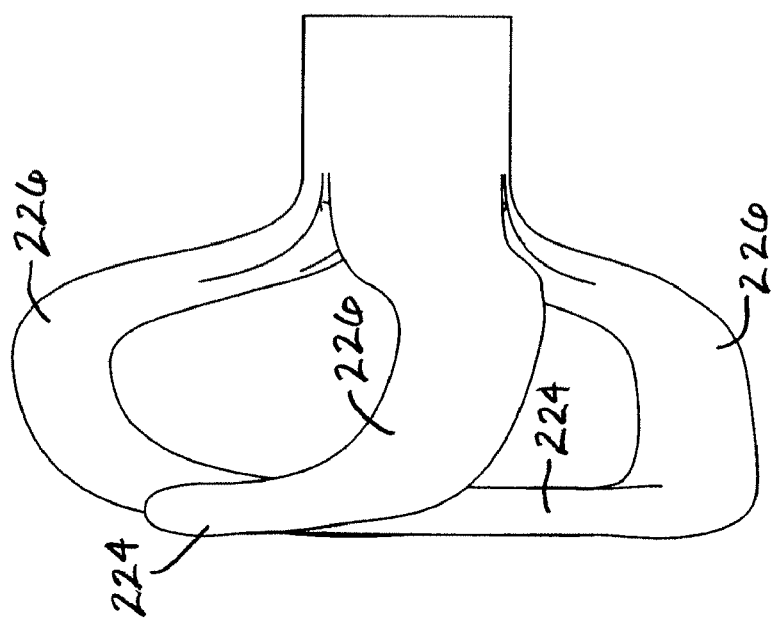
FIG. 8A is a side view showing the compressor interstage flow passages as a solid body.
Figure 9:
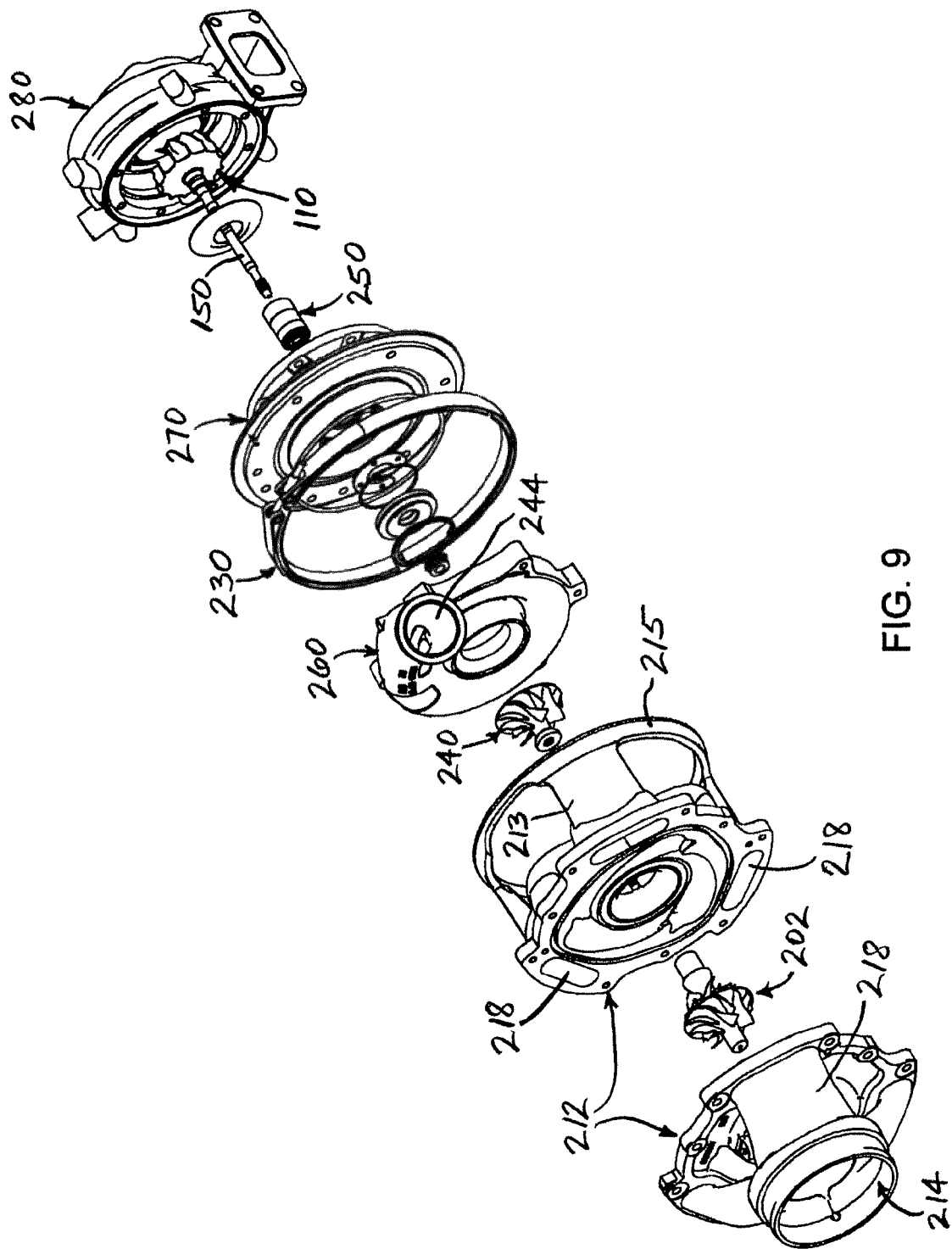
FIG. 9 is an exploded view of the turbocharger of FIG. 3.

As can be seen in FIGS. 6-8, which depict the flow passages as if they were solid bodies (omitting the compressor housing for clarity of illustration), both the inlet and interstage ducts take advantage of cyclic-symmetry to create a repeating pattern and thus localize any variation to within each passage. In addition, the small vaneless diffuser 222, the partial volutes 224, and the three interstage ducts 226 are designed to minimize the flow separation as the flow has to wrap around the rear inlet space and flow into the second-stage inlet. Also, this arrangement will minimize the diffusion from the first-stage compressor and subsequent re-acceleration radially inward that is typical in an annular duct as a result of conservation of angular momentum. Instead, the interstage ducts 226 are designed to have a substantially constant flow area from the vaneless diffuser 222 to the second-stage inlet, thus maintaining a constant velocity that should minimize diffusion/expansion losses.

In addition, the physical connection between the inlet ducts and the interstage ducts is minimized, which is important in keeping the temperature of the inlet flow to the rear impeller nearly identical to that of the front impeller. In this regard, the inlet ducts 218 and interstage ducts 226 alternate with one another in the circumferential direction about the rotational axis, and there is space between each inlet duct and the adjacent interstage ducts, such that there is thermal isolation between them.

In spite of the compliant properties of the foil bearing, maintaining alignment of the three bearings with the complex housings required to route flow through the compressor section is a challenging design problem. The second-stage compressor discharges its pressurized air through a volute 242 (FIG. 3), which has a non-axisymmetric and non-cyclic-symmetric shape. Attaching the second-stage compressor housing 260 using conventional mechanisms such as bolted flange or V-band joints will not provide consistent alignment of the three bearing bores under operating conditions that cause deformations of parts by thermal growth and/or pressurization of the housings.

A novel method of designing the static structure that assures alignment in spite of the necessity of a second-stage volute is shown in FIG. 3. A portion of the first-stage compressor housing 212 is constructed to connect directly to the center housing 270 (which holds the ball bearing cartridge 250), without connection through the volute 242 of the second-stage compressor housing 260. Specifically, the first-stage compressor housing 212 has three circumferentially spaced "legs" 213 respectively attached to (and preferably integrally formed with) the three first-stage rear inlet ducts 218. These legs connect to a concentric flange 215 that is attached through a V-band 230 to the flange of the center housing 270. The second-stage compressor housing 260 is bolted directly to the center housing flange and is located radially inside the V-band flange. The outlet 244 (FIG. 9) of the second-stage volute 242 protrudes through one of the spaces between the legs 213.

The attachment of the second-stage compressor housing 260 to the first-stage compressor housing 212 is accomplished by a flexible connection such as an O-ring 262 (FIG. 3); alternatively, a metal "C" seal or bellows can be used. In the illustrated embodiment, the flexible connection comprises a generally annular portion of one of the compressor housings (in this case, the first-stage housing 212) received within a generally annular portion of the other of the compressor housings (in this case, the second-stage housing 260), with a radial clearance existing between the annular portions, a flexible compressible element such as O-ring 262 being disposed between the annular portions to seal the flexible connection. Thus, the second-stage compressor housing can move in an undesirable way without having a multiplicative effect that would have been the result of a design cantilevering the first-stage compressor housing from the second-stage compressor housing. The interstage ducts 226 have cyclic-symmetry, thereby helping to ensure concentricity regardless of the thermal gradients that exist along the length of the ducts.

This unique design not only assures alignment of the three bearing bores, but also has a similar effect on the first-stage double-sided wheel 202 and its associated housing 212. This will enable a reduction in the clearance between the wheel and the housing contour, thus improving the efficiency of the stage.

An additional benefit of this design is that the foil bearing is essentially thermally de-coupled from the second-stage volute 242, which can run at a temperature higher than the foil bearing's capability. The foil bearing is described now with primary reference to FIG. 11, which depicts the rear half of the first-stage compressor housing 212 together with the foil bearing components in exploded view, and FIG. 12, which shows a fragmentary cross-sectional view through the foil bearing assembly. The housing 212 defines a central bore 217 of slightly greater diameter than the foil bearing journal 160 that is part of the first-stage compressor wheel 202 (FIG. 13). Accordingly, there is a radial clearance between the journal 160 and the bore 217. Formed in the inner surface of the bore 217 are a plurality (five, in the illustrated embodiment) of circumferentially spaced radial slots 219 that extend parallel to the rotational axis of the compressor rotor. The foil bearing assembly comprises a plurality of arcuate spring elements 162 and a plurality of arcuate foil segments 164, the number of each being the same as the number of slots 219 (thus, five, in the illustrated embodiment). Each of the spring elements 162 undulates in the circumferential direction so as to define undulations that extend axially. The radially outer surfaces of the undulations of the spring elements 162 abut the inner surface of the housing bore 217. Each of the spring elements 162 has one of its longitudinal edges bent to extend radially outwardly, and this edge is inserted into one of the slots 219 in the inner surface of the bore 217. The foil segments 164 are disposed radially inward of the spring elements 162 adjacent the outer surface of the first-stage compressor wheel journal 160. At zero and low speeds, the foil segments are against the journal 160; when the rotational speed becomes great enough to develop sufficient pressure, the foil segments are pushed away from the journal so that a clearance exists between them. Each of the foil segments has medial portion (with respect to the circumferential extent of the segment) bent in a generally U-shaped configuration that extends radially outwardly, and this U-shaped portion is inserted into one of the slots 219 along with the bent edge of one of the spring elements 162. The engagement of the portions of the foil segments and spring elements in the slots 219 prevents the foil assembly from rotating when the journal 160 rotates. The foil segments generally comprise a metal substrate having a friction-reducing coating on the radially inner surface that faces the journal. Various coatings can be employed, including but not limited to polymer-based coatings, metal oxide-based coatings (e.g., NASA PS 304), etc. As an alternative to using a plurality of spring elements 162 and foil segments 164, it is possible to use one-piece spring and foil members each extending 360° about the axis and each being axially split and having portions bent outwardly and engaged in a single slot in the bore 219.

Figure 14:
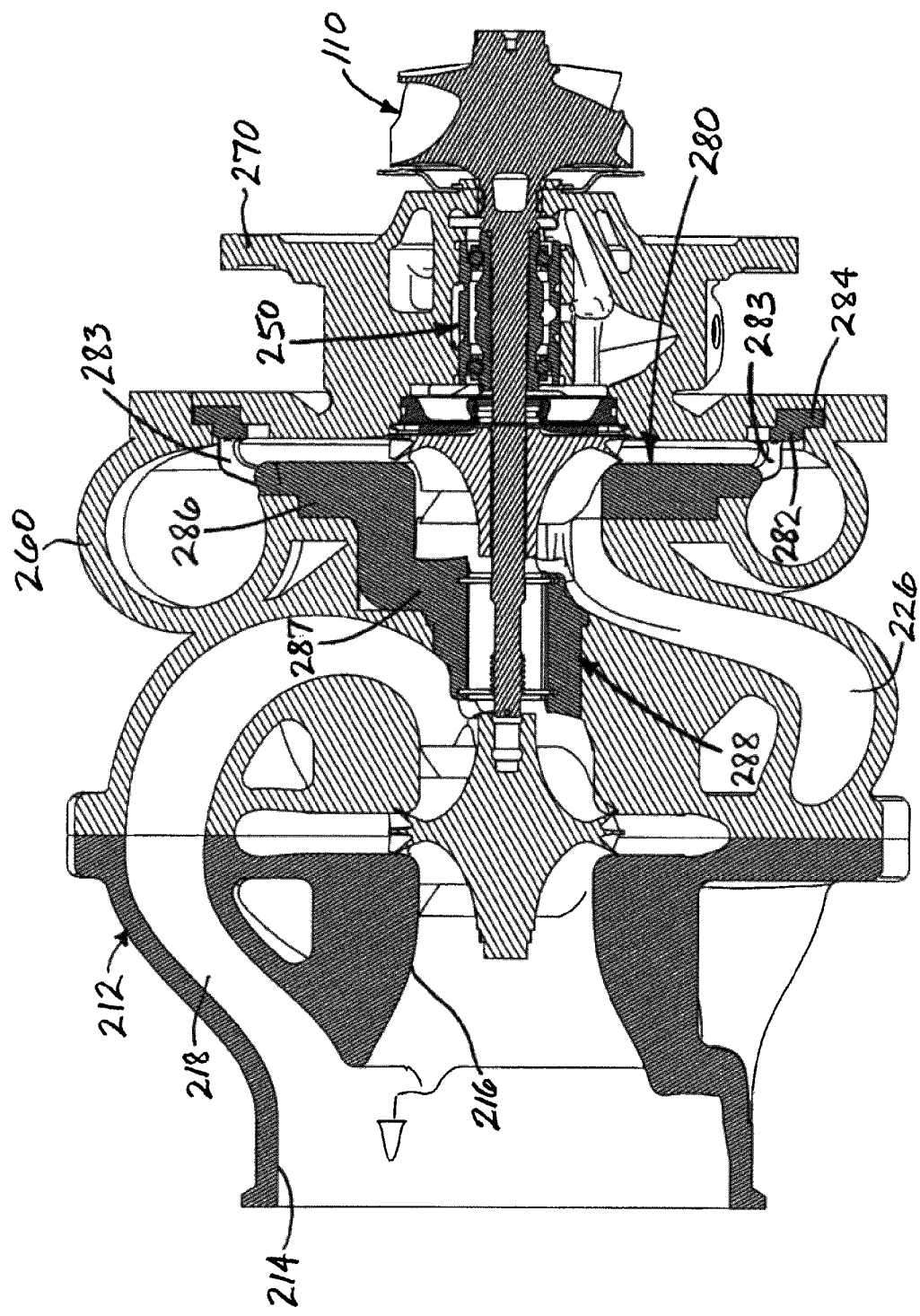
FIG. 14 is an axial cross-sectional view of an alternative embodiment of a turbocharger in accordance with the invention.
Figure 15:
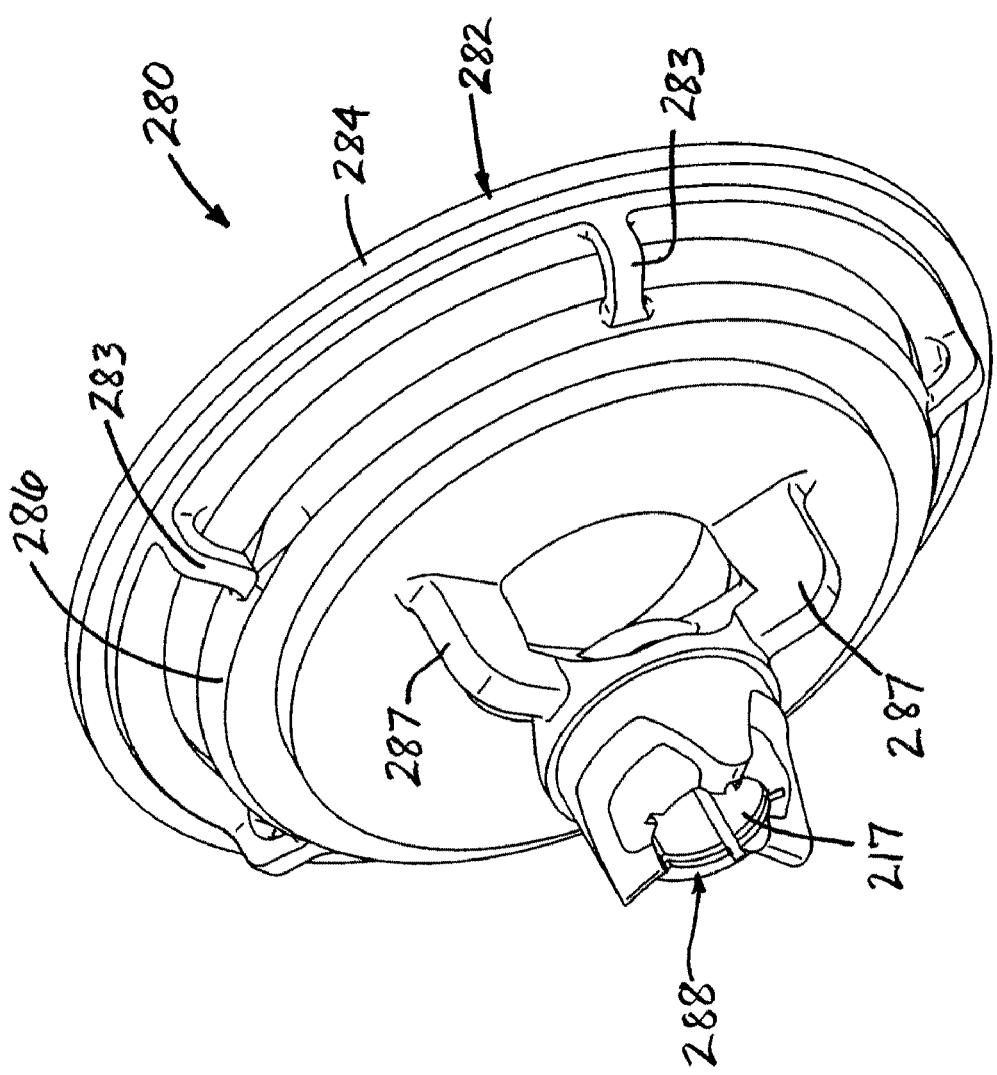
FIG. 15 is a perspective view of a foil bearing holder used in the turbocharger of FIG. 14.

FIGS. 14 and 15 depict an alternative approach to constructing the housing structure of the turbocharger. A foil bearing holder 280 is connected between the second-stage compressor housing 260 and the center housing 270. The bearing holder 280 has a spoked design that is cyclic-symmetric and crosses the flow path twice. In particular, the bearing holder has an outer ring-shaped portion 282 defining a flange 284 that is captured between a flange of the second-stage compressor housing 260 and a flange of the center housing 270. The bearing holder further includes an inner ring-shaped portion 286 that is connected to the outer ring-shaped portion 282 by a plurality of circumferentially spaced legs 283 that cross the flow path of the second compressor stage in the region between the second-stage diffuser and second-stage volute. The bearing holder also includes a bore-defining portion 288 that is connected to the inner ring-shaped portion 286 by a plurality of circumferentially spaced legs 287 that cross in between the interstage ducts 226. The bore-defining portion 288 includes the central bore 217 for the foil bearing assembly, which is substantially as previously described for the prior embodiment. The cyclic-symmetry of the bearing holder 280 assures the alignment of the foil bearing with the ball bearing cartridge 250. This provides an alternative method of keeping the foil bearing aligned with the ball bearing cartridge, but has the drawback that it provides a heat conduction path from the high-temperature second-stage compressor back to the foil bearing.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An exhaust gas-driven turbocharger, comprising:
a shaft having a first end and a second end;
a one-stage turbine wheel mounted on the shaft proximate the first end;
a turbine housing surrounding the turbine wheel and defining ducting for directing exhaust gas into and out of the turbine wheel;
a first-stage compressor wheel mounted on the shaft proximate the second end, the first-stage compressor wheel comprising first and second impellers disposed back-to-back;
a second-stage compressor wheel mounted on the shaft at a location intermediate the first-stage compressor wheel and the turbine wheel; and
a compressor housing assembly surrounding the first- and second-stage compressor wheels and defining:
inlet ducting configured to direct two separate portions of air in generally opposite axial directions into respective inlets of the first and second impellers of the first-stage compressor wheel, wherein the inlet ducting comprises a common duct configured to conduct air for both the first and second impellers of the first-stage compressor wheel, a first duct configured to conduct one portion of the air from the common duct into the inlet of the first impeller, and a plurality of separate second ducts configured to conduct a remaining portion of the air from the common duct into the inlet of the second impeller, wherein the second ducts are circumferentially spaced apart from one another about a rotational axis defined by the shaft;
interstage ducting configured to direct pressurized air from an exit of each of the impellers of the first-stage compressor wheel into an inlet of the second-stage compressor wheel; and
discharge ducting configured to collect pressurized air discharged from the second-stage compressor wheel for supply to an intake of an internal combustion engine;
wherein the first- and second-stage compressor wheels and the turbine wheel are all fixedly mounted on the shaft and therefore rotate at the same angular rate of rotation.

2. The exhaust gas-driven turbocharger of claim 1, wherein the interstage ducting comprises a plurality of separate third ducts circumferentially spaced apart from one another about the rotational axis.

3. The exhaust gas-driven turbocharger of claim 2, wherein the second and third ducts alternate with one another in the circumferential direction about the rotational axis.

4. The exhaust gas-driven turbocharger of claim 3, wherein there are three second ducts and three third ducts.

5. The exhaust gas-driven turbocharger of claim 2, wherein there is space between each second duct and the third ducts adjacent thereto, such that there is thermal isolation between the second and third ducts.

6. The exhaust gas-driven turbocharger of claim 2, wherein each of the third ducts has a substantially constant flow area between the exit of the first-stage compressor wheel and the inlet of the second-stage compressor wheel.

7. The exhaust gas-driven turbocharger of claim 2, wherein there are three third ducts respectively connected to three partial volutes that received pressurized air from the first-stage compressor wheel, each of the partial volutes occupying substantially one-third of a 360° circumference about the rotational axis.

8. The exhaust gas-driven turbocharger of claim 7, wherein a vaneless diffuser connects each of the first and second impellers of the first-stage compressor wheel to the partial volutes.

9. The exhaust gas-driven turbocharger of claim 1, further comprising a first bearing assembly rotatably supporting the shaft at a location between the turbine wheel and the second-stage compressor wheel, and a center housing formed separately from the compressor housing assembly, the first bearing assembly being contained in the center housing.

10. The exhaust gas-driven turbocharger of claim 9, wherein the compressor housing assembly includes a first-stage compressor housing that contains the first-stage compressor wheel and defines the inlet ducting and interstage ducting, and a second-stage compressor housing that contains the second-stage compressor wheel and defines the discharge ducting in the form of a discharge volute for the second-stage compressor wheel, the second-stage compressor housing being formed separately from the first-stage compressor housing.

11. The exhaust gas-driven turbocharger of claim 10, wherein the center housing defines a generally annular flange that extends generally radially outwardly, the first-stage compressor housing is affixed to the flange of the center housing, and the second-stage compressor housing is affixed to the flange of the center housing independently of the affixation of the first-stage compressor housing thereto.

12. The exhaust gas-driven turbocharger of claim 11, wherein the first-stage compressor housing defines a plurality of separate legs that are circumferentially spaced apart from one another and that extend generally axially and are affixed to the flange of the center housing.

13. The exhaust gas-driven turbocharger of claim 12, wherein each of the legs is formed integrally with a respective one of the second ducts.

14. The exhaust gas-driven turbocharger of claim 10, further comprising a second bearing assembly rotatably supporting the shaft at a location between the first- and second-stage compressor wheels, the second bearing assembly comprising a foil air bearing.

15. The exhaust gas-driven turbocharger of claim 14, wherein the foil air bearing includes a foil bearing journal formed as an integral part of the first-stage compressor wheel.

16. The exhaust gas-driven turbocharger of claim 14, wherein the foil air bearing also serves as a seal between the first- and second-stage compressor wheels, and is arranged such that air that leaks through the seal cools the foil air bearing.

17. The exhaust gas-driven turbocharger of claim 14, wherein the second-stage compressor housing is connected by a flexible connection to the first-stage compressor housing in the region of the interstage ducting.

18. The exhaust gas-driven turbocharger of claim 17, wherein the flexible connection comprises a generally annular portion of one of the compressor housings received within a generally annular portion of the other of the compressor housings, with a radial clearance existing between the annular portions, a flexible compressible element being disposed between the annular portions to seal the flexible connection.

19. An exhaust gas-driven turbocharger, comprising:
a shaft having a first end and a second end;
a one-stage turbine wheel mounted on the shaft proximate the first end;
a turbine housing surrounding the turbine wheel and defining ducting for directing exhaust gas into and out of the turbine wheel;
a first-stage compressor wheel mounted on the shaft proximate the second end, the first-stage compressor wheel comprising first and second impellers disposed back-to-back;
a second-stage compressor wheel mounted on the shaft at a location intermediate the first-stage compressor wheel and the turbine wheel; and
a compressor housing assembly surrounding the first- and second-stage compressor wheels and defining:
inlet ducting configured to direct two separate portions of air in generally opposite axial directions into respective inlets of the first and second impellers of the first-stage compressor wheel;
interstage ducting configured to direct pressurized air from an exit of each of the impellers of the first-stage compressor wheel into an inlet of the second-stage compressor wheel; and
discharge ducting configured to collect pressurized air discharged from the second-stage compressor wheel for supply to an intake of an internal combustion engine;
wherein the first- and second-stage compressor wheels and the turbine wheel are all fixedly mounted on the shaft and therefore rotate at the same angular rate of rotation,
wherein the first-stage compressor wheel is affixed to the shaft by a boreless joint.

20. The exhaust gas-driven turbocharger of claim 19, wherein the interstage ducting comprises a plurality of separate third ducts circumferentially spaced apart from one another about the rotational axis.

21. The exhaust gas-driven turbocharger of claim 20, wherein the second and third ducts alternate with one another in the circumferential direction about the rotational axis.

22. The exhaust gas-driven turbocharger of claim 19, wherein there is space between each second duct and the third ducts adjacent thereto, such that there is thermal isolation between the second and third ducts.

23. The exhaust gas-driven turbocharger of claim 19, further comprising a first bearing assembly rotatably supporting the shaft at a location between the turbine wheel and the second-stage compressor wheel, and a center housing formed separately from the compressor housing assembly, the first bearing assembly being contained in the center housing.

24. The exhaust gas-driven turbocharger of claim 23, wherein the compressor housing assembly includes a first-stage compressor housing that contains the first-stage compressor wheel and defines the inlet ducting and interstage ducting, and a second-stage compressor housing that contains the second-stage compressor wheel and defines the discharge ducting in the form of a discharge volute for the second-stage compressor wheel, the second-stage compressor housing being formed separately from the first-stage compressor housing.

25. The exhaust gas-driven turbocharger of claim 24, wherein the center housing defines a generally annular flange that extends generally radially outwardly, the first-stage compressor housing is affixed to the flange of the center housing, and the second-stage compressor housing is affixed to the flange of the center housing independently of the affixation of the first-stage compressor housing thereto.

26. The exhaust gas-driven turbocharger of claim 25, wherein the first-stage compressor housing defines a plurality of separate legs that are circumferentially spaced apart from one another and that extend generally axially and are affixed to the flange of the center housing.

27. The exhaust gas-driven turbocharger of claim 26, wherein each of the legs is formed integrally with a respective one of the second ducts.

28. The exhaust gas-driven turbocharger of claim 24, further comprising a second bearing assembly rotatably supporting the shaft at a location between the first- and second-stage compressor wheels, the second bearing assembly comprising a foil air bearing.

29. The exhaust gas-driven turbocharger of claim 28, wherein the foil air bearing includes a foil bearing journal formed as an integral part of the first-stage compressor wheel.

* * * * *